US011119901B2

(12) United States Patent
Jagannath et al.

(10) Patent No.: US 11,119,901 B2
(45) Date of Patent: Sep. 14, 2021

(54) TIME-LIMITED DYNAMIC TESTING PIPELINES

(71) Applicant: MICRO FOCUS LLC, Santa Clara, CA (US)

(72) Inventors: Kishore Jagannath, Bangalore (IN); Namitha R Prabhu, Bangalore (IN)

(73) Assignee: MICRO FOCUS LLC, Santa Clara, CA (US)

( * ) Notice: Subject to any disclaimer, the term of this patent is extended or adjusted under 35 U.S.C. 154(b) by 25 days.

(21) Appl. No.: 16/675,658

(22) Filed: Nov. 6, 2019

(65) Prior Publication Data

US 2020/0250078 A1 Aug. 6, 2020

(30) Foreign Application Priority Data

Feb. 1, 2019 (IN) .............................. 201941004130

(51) Int. Cl.
*G06F 11/36* (2006.01)
*G06N 20/00* (2019.01)
*G06N 5/04* (2006.01)

(52) U.S. Cl.
CPC ...... *G06F 11/3684* (2013.01); *G06F 11/3688* (2013.01); *G06N 5/04* (2013.01); *G06N 20/00* (2019.01)

(58) Field of Classification Search
None
See application file for complete search history.

(56) References Cited

U.S. PATENT DOCUMENTS

| 8,037,453 | B1* | 10/2011 | Zawadzki | .................. G06F 8/71 |
| | | | | 717/123 |
| 9,037,915 | B2* | 5/2015 | D'Alterio | ........... G06F 11/3692 |
| | | | | 714/38.1 |
| 10,025,692 | B2 | 7/2018 | Wood | |
| 10,073,763 | B1 | 9/2018 | Raman | |
| 10,142,204 | B2 | 11/2018 | Nickolov | |
| 10,289,539 | B1* | 5/2019 | Arguelles | ............ G06F 11/3664 |
| 10,678,678 | B1* | 6/2020 | Tsoukalas | ........... G06F 11/3664 |

(Continued)

FOREIGN PATENT DOCUMENTS

| WO | WO2018006097 A1 | 1/2018 |
| WO | WO2018029668 A1 | 2/2018 |

OTHER PUBLICATIONS

Telerik, "Set Test Execution Time Limit", 2018, Telerik Test Studio (Year: 2018).*
Haroon, "Investigating the rule of re-ordering algorithm in order to optimize software testing pipelines", 2017, University of Oslo (Year: 2017).*

(Continued)

*Primary Examiner* — Hossain M Morshed

(57) ABSTRACT

According to examples, an apparatus may include a processor that may generate automated and dynamic fail-fast testing pipelines that are efficiently executed to quickly identify tests for which changes to components such as an application will likely fail. The processor may train a classifier to predict whether changes to the application will fail a test procedure and use the classifier to generate machine-learned predictions of test outcomes to generate failure probabilities. The testing pipeline may be dynamically re-ordered based on the failure probabilities. The processor may also group the test procedures into lifecycle stages. Historical performance data may be used to identify time-limits by which to complete the test procedures of each lifecycle stage. Thus, the generated dynamic testing pipe- (Continued)

lines may be generated based on the likelihood of failures and test procedure duration.

20 Claims, 7 Drawing Sheets

(56) References Cited

U.S. PATENT DOCUMENTS

| | | | | |
|---|---|---|---|---|
| 2007/0180429 A1* | 8/2007 | Gogh | ............... | G06F 11/3672 717/126 |
| 2013/0219227 A1* | 8/2013 | Augustine | ........... | G06F 11/3688 714/38.1 |
| 2015/0026121 A1* | 1/2015 | Shani | ............... | G06F 16/24578 707/609 |
| 2016/0321586 A1* | 11/2016 | Herzig | ............ | G06Q 10/06313 |
| 2017/0228312 A1* | 8/2017 | Shani | ............... | G06F 16/24578 |
| 2018/0196731 A1* | 7/2018 | Moorthi | ............. | G06F 11/3664 |
| 2018/0329738 A1 | 11/2018 | Kasha | | |
| 2020/0250078 A1* | 8/2020 | Jagannath | ............... | G06N 5/04 |

OTHER PUBLICATIONS

Haroon, "Investigating the rule re-ordering algorithm in order to optimize software testing pipelines", 2017, University of Oslo (Year: 2017).*

Walcott, "TimeAware Test Suite Prioritization", 2006, ACM (Year: 2006).*

DAT; Imagine Yourself At DAT Solutions; https://stackoverflow.com/questions/42837066/can-i-create-dynamically-stages-in-a-jenkins-pipeline; Nov. 2018; 4 pages.

Haroon; Investigating the Rule Re-ordering Algorithm in order to optimize Software Testing Pipelines; UIO, University of Oslo; Master's Thesis; 2017; 216 pages.

Spieker, et al; Reinforcement Learning for Automatic Test Case Prioritization and Selection in Continuous integration; ISSTA 2017; Jul. 2017; 12 pages.

* cited by examiner

DEFAULT TEST ORDER
300

| POS. | TEST |
|---|---|
| 1 | TP(A) |
| 2 | TP(B) |
| 3 | TP(C) |
| 4 | TP(D) |
| 5 | TP(E) |
| 6 | TP(F) |
| 7 | TP(G) |
| 8 | TP(H) |
| 9 | TP(I) |
| 10 | TP(J) |

Re-order based on Probabilities of Failure

DYNAMIC TEST ORDER
310

| POS. | TEST | PROB. |
|---|---|---|
| 1 | TP(H) | 0.9 |
| 2 | TP(J) | 0.8 |
| 3 | TP(E) | 0.78 |
| 4 | TP(G) | 0.72 |
| 5 | TP(A) | 0.67 |
| 6 | TP(B) | 0.67 |
| 7 | TP(I) | 0.58 |
| 8 | TP(C) | 0.4 |
| 9 | TP(D) | 0.1 |
| 10 | TP(F) | 0.1 |

MACHINE-READABLE STORAGE MEDIUM
600

RECEIVE AN INDICATION THAT A FEATURE OF A COMPONENT HAS BEEN ALTERED, WHEREIN THE ALTERED FEATURE IS TO BE TESTED BASED ON A PLURALITY OF TEST PROCEDURES TO BE EXECUTED IN A DEFAULT TEST ORDER
602

DETERMINE A RESPECTIVE PROBABILITY THAT THE COMPONENT WITH THE ALTERED FEATURE WILL FAIL EACH OF THE PLURALITY OF TEST PROCEDURES
604

CHANGE THE DEFAULT TEST ORDER TO GENERATE A DYNAMIC TEST ORDER BASED ON THE RESPECTIVE PROBABILITIES
606

DETERMINE, FOR EACH OF THE PLURALITY OF TEST PROCEDURES, HISTORICAL INFORMATION INDICATING A DURATION OF EACH TEST PROCED
608

IDENTIFY A RESPECTIVE TIME LIMIT BY WHICH TO PERFORM EACH OF A PLURALITY OF LIFECYCLE STAGES
610

GENERATE A DYNAMIC TESTING PIPELINE BASED ON THE PLURALITY OF LIFECYCLE STAGES, THE DYNAMIC TEST ORDER, AND THE RESPECTIVE TIME LIMITS
612

*FIG. 6*

TIME-LIMITED DYNAMIC TESTING PIPELINES

BACKGROUND

Changes to components such as software applications are conventionally tested prior to release. Development operations "devops" continuous delivery processes have been created to assist with the development, testing, and release cycles. A challenge in building a testing pipeline to test changes that these pipelines organize tests in a static order. Thus, a test failure late in the pipeline may waste time, organizational effort, and computational resources.

BRIEF DESCRIPTION OF THE DRAWINGS

Features of the present disclosure may be illustrated by way of example and not limited in the following figure(s), in which like numerals indicate like elements, in which:

FIG. 6 shows a block diagram of an example non-transitory machine-readable storage medium for generating time-limited dynamic testing pipelines.

DETAILED DESCRIPTION

Figure 1:
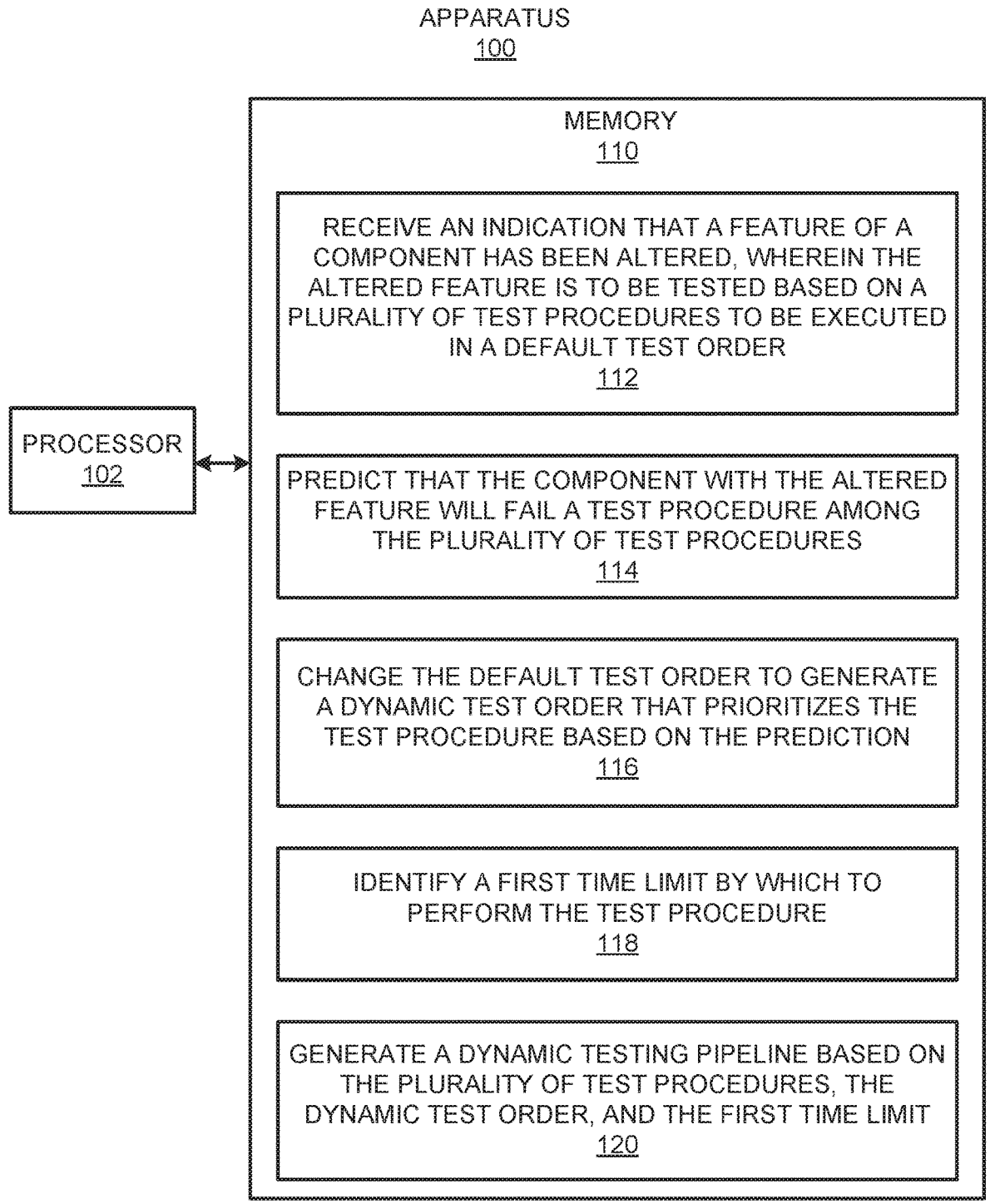
FIG. 1 shows a block diagram of an example apparatus that may generate time-limited dynamic testing pipelines.

For simplicity and illustrative purposes, the present disclosure may be described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" may be intended to denote at least one of a particular element. As used herein, the term "includes" means includes but not limited to, the term "including" means including but not limited to. The term "based on" means based at least in part on.

In examples, dynamic testing pipelines may be generated as part of a devops continuous delivery process that test changes to components such as software source code prior to releasing the changes. A dynamic testing pipeline may include a default order of test procedures to be executed. A probability that the changes to the components will fail each test procedure may be generated, and the default order may be altered accordingly so that test procedures that are likely to fail are prioritized earlier in the testing pipeline. As used herein, a test procedure that is "likely to fail" or "will fail" and similar terms actually refers to a change to a component that is likely to fail or will fail the test procedure. The probabilities may be generated based on machine-learned models that may be trained using results of prior testing outcomes. By identifying test procedures likely to fail and prioritizing those procedures so that they are tested first, a fail fast pipeline may be developed in which failures may be identified sooner in the testing process, improving testing efficiency.

The dynamic testing pipeline may be grouped into multiple lifecycle stages during which various test procedures associated within each lifecycle stage are executed in a prioritized order based on the probabilities of failure for each test procedure. Each lifecycle stage may be sequentially performed and may be assigned with a time limit by which to perform its associated test procedures. Each time limit may be determined based on historical information indicating a duration of execution of test procedures from prior testing continuous delivery pipelines. For example, a time limit for a life cycle stage may be calculated as a sum of the average (or maximum) durations of each test procedure in the lifecycle stage. As such, efficiency of the dynamic testing pipeline is further enhanced because each lifecycle stage is provided with a defined time limit by which to perform associated test procedures before the next lifecycle stage is to be executed.

The dynamic testing pipelines facilitate automated and dynamic generation of fail-fast testing pipelines in a continuous delivery process that may be efficiently executed to quickly identify tests for which changes to components will likely fail. By employing machine-learned models of test outcomes to predict failure probabilities and using historical performance data to identify time-limits, various examples described herein may improve a devops system's ability to generate dynamic testing pipelines that take into account likelihood of failures and test duration. The dynamic testing pipelines may enable organizations to speed up the testing process, saving both computational resources used for testing (and personnel resources for conducting any human-executed tests), as well as speeding up time to market of changes made to components.

Various examples disclosed herein relate to software components that are newly created or modified and tested using the time-limited dynamic testing pipelines. These examples are used for illustrative purposes. Other examples of components and their changes may be tracked and tested as well. As such, dynamic testing pipelines may be generated for other types of components based on the disclosure herein.

Reference is first made to FIG. 1, which shows a block diagram of an example apparatus 100 that may generate time-limited dynamic testing pipelines. It should be understood that the example apparatus 100 depicted in FIG. 1 may include additional features and that some of the features described herein may be removed and/or modified without departing from any of the scopes of the example apparatus 100.

The apparatus 100 shown in FIG. 1 may be a computing device, a server, or the like. As shown in FIG. 1, the apparatus 100 may include a processor 102 that may control operations of the apparatus 100. The processor 102 may be a semiconductor-based microprocessor, a central processing unit (CPU), an application specific integrated circuit (ASIC), a field-programmable gate array (FPGA), and/or other suitable hardware device. Although the apparatus 100 has been depicted as including a single processor 102, it should be understood that the apparatus 100 may include multiple processors, multiple cores, or the like, without departing from the scopes of the apparatus 100 disclosed herein.

The apparatus 100 may include a memory 110 that may have stored thereon machine-readable instructions (which may also be termed computer readable instructions) 112-120 that the processor 102 may execute. The memory 110 may be an electronic, magnetic, optical, or other physical storage device that includes or stores executable instructions. The memory 110 may be, for example, Random Access memory (RAM), an Electrically Erasable Programmable Read-Only Memory (EEPROM), a storage device, an optical disc, and the like. The memory 110 may be a non-transitory machine-readable storage medium, where the term "non-transitory" does not encompass transitory propagating signals. Attention will now turn to operations that the processor 102 may implement to generate time-limited testing pipelines.

Referring to FIG. 1, the processor 102 may fetch, decode, and execute the instructions 112 to receive an indication that a feature of a component has been altered, wherein the altered feature is to be tested based on a plurality of test procedures to be executed in a default test order.

The plurality of test procedures may be included in a default testing pipeline that has a default testing order for the plurality of test procedures. As previously noted, some of these test procedures may take longer than others to complete. In some testing pipelines, a test procedure that is late in the pipeline may fail. In order to mitigate this possibility, the processor 102 may fetch, decode, and execute the instructions 114 to predict that the component with the altered feature will fail a test procedure among the plurality of test procedures. In this way, a test procedure that is predicted to fail may be identified.

In some examples, to fail fast, saving compute and other resource time, the processor 102 may fetch, decode, and execute the instructions 116 to change the default test order to generate a dynamic test order that prioritizes the test procedure based on the prediction. For instance, the test procedure predicted to fail may be placed earlier in the dynamic test order than in the default test order. This may ensure that test procedures predicted to fail are tested first. Put another way, test procedures not predicted to fail may be de-prioritized and tested later than those test procedures predicted to fail.

The processor 102 may fetch, decode, and execute the instructions 118 to identify a first time limit by which to perform the test procedure. Because any testing pipeline may have dependencies in which one test procedure has to wait for completion of a prior test procedure in the pipeline, the processor 102 may institute time limits by which the test procedure is to be performed.

The processor 102 may fetch, decode, and execute the instructions 120 to generate a dynamic testing pipeline based on the plurality of test procedures, the dynamic test order, and the first time limit. The dynamic testing pipeline may therefore be configured to fail fast and be time-limited to minimize processing time required for the dynamic testing pipeline to complete.

Figure 2:
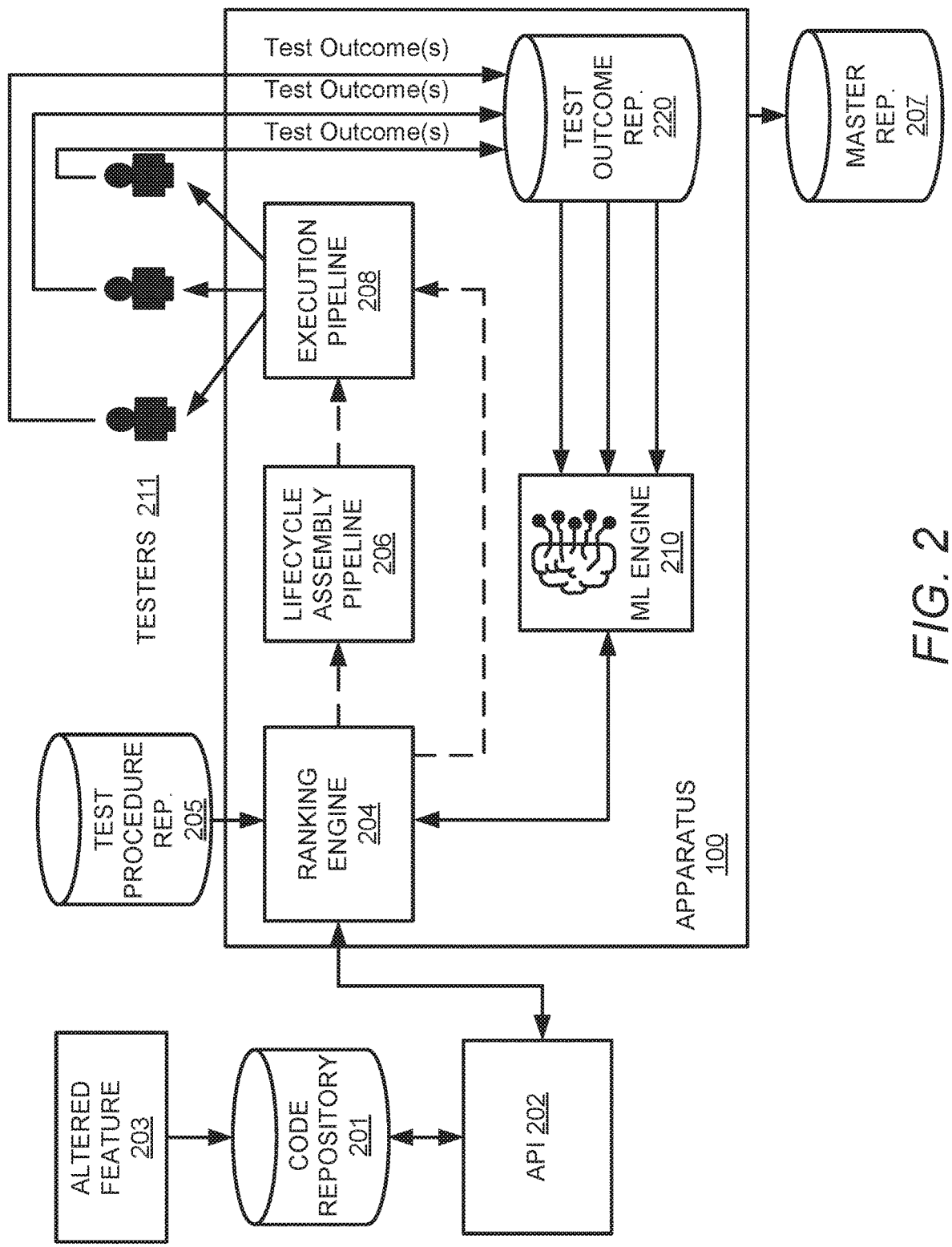
FIG. 2 shows a block diagram of an example data flow diagram for generating time-limited dynamic testing pipelines.

FIG. 2 shows a block diagram of an example data flow diagram for generating time-limited dynamic testing pipelines. The data flow diagram may represent further details of processing by the apparatus 100 illustrated in FIG. 1 to generate and execute a time-limited dynamic testing pipeline for a component.

In some examples, the component may include software that has been newly created or updated to generate an initial or updated version of the software. In either of these examples, the initial or updated version of the software may be checked into a repository such as a code repository 201. For example, a software developer may complete a revision to the software and save the revision to the code repository 201 during a check-in procedure.

The apparatus 100 may receive an indication of such a check-in procedure. In this manner, the software check-in may initiate generation and execution of a testing pipeline that includes a plurality of test procedures to determine whether the initial or updated software should be released. More particularly, the testing pipeline may be used to test an "altered feature" 203 of the software, where such altered feature is a new feature or updated feature for either an initial version or updated version of the software. If the altered feature 203 passes the test procedures, the altered feature 203 may be incorporated into a master repository 207 for release as or part of production software.

The code repository 201 may include attributes of the altered feature 203, such as, without limitation, an author of the altered feature, a nature of the altered feature (such as a minor bug fix, newly added software feature, major revision, etc.), day of the week of the check-in or creation of the altered feature, a date and/or time of the check-in or creation of the altered feature, a product associated with the altered feature, a version number, and/or other description of the altered feature. In some examples, the apparatus 100 may use the attributes as input parameters to a machine-learned model of test procedures to generate, for each test procedure, a probability that the altered feature will fail. In other words, the machine-learned model may be used to predict whether or not the altered feature will fail a given test procedure based on attributes of the altered feature.

Upon check-in, the apparatus 100 may use an application programming interface (API) 202 to obtain the attributes of the altered feature 203. The API 202 may be used to interface with various types of code repositories 201. The apparatus 100 may include various components that use the attributes of the altered feature 203 to generate the time-limited dynamic testing pipelines. In various examples, these components may operate as instructions that program the processor 102 (FIG. 1), hardware modules programmed to perform the described functions, or combinations thereof. For instance, the apparatus 100 may include a ranking engine 204, an assembly pipeline 206, a execution pipeline 208, a machine learning (ML) engine 210, a test outcome repository 220, and/or other components.

The ranking engine 204 may receive an indication of the check-in. Responsive to the indication, the ranking engine 204 may obtain a listing of relevant test procedures that validate the altered feature associated with the check-in and a default test order that specifies an order in which the test procedures should be conducted. For example, the test procedures may be predefined to test software that has been created or updated to include the altered feature. The default test order may specify the order in which the test procedures are to be tested. As such, the test procedures ordered according to the default test order may be used to generate a default testing pipeline. The ranking engine 204 may obtain the test procedures and the default test order from the test procedure repository 205.

In examples, the ranking engine 204 may re-order the default test order such that an order of the test procedures is changed to generate a dynamic test order. For instance, a particular test procedure may be moved earlier or later in the test order. Such order change may result in a new, dynamic test order of the test procedures. As such, a dynamic testing pipeline may be generated based on the test procedures and the dynamic test order.

In examples, the ranking engine 204 may prioritize the particular test procedure based on a prediction that the altered feature will fail the particular test procedure. For instance, the particular test procedure may be moved up in the test order so that the dynamic testing pipeline fails fast. Other test procedures also predicted to fail may be similarly prioritized. Such prioritization may be based on respective probabilities that each test procedure will be failed. For example, the ranking engine 204 may generate the dynamic test order based on respective probabilities of failure, in which tests having higher probability of failures will be placed earlier in the dynamic test order than tests having lower probabilities of failure.

Figure 3:
FIG. 3 shows a block diagram of an example default testing pipeline.

Referring to FIGS. 2 and 3, a default test order 300 may include ten test procedures (TP(A)-(J)) that are to be tested in successive order according to respective test positions ("POS") 1-10, in which the test procedure at POS 1 is to be tested first and the test procedure at POS 10 is to be tested last. Other numbers of test procedures may be used as well. The ranking engine 204 may generate a dynamic test order based on respective probabilities ("PROB") that a corresponding test procedure TP(A)-(J) will be failed.

To predict the probabilities of failures, the ranking engine 204 may obtain an attribute of the altered feature 203 via the API 202. Such attributes may be correlated with observed failures. In particular, the ranking engine 204 may provide the attribute as input to the ML engine 210, which may employ a machine-learned model of attributes and test procedures. The ML engine 210 may provide as output a classification of whether a test procedure will be failed based on an attribute of the altered feature 203. In other words, the ML engine 210 may generate a machine-learned probability that a test procedure will be failed based on the attribute of the altered feature 203.

The ML engine 210 may therefore leverage observed data to train a model that takes into account that certain attributes of altered features 203 tend to result in a failure of test procedures. For instance, the ML engine 210 may learn that a specific developer tends to result in more test procedure failures than other developers. Other attributes may be used as well, such as whether or not certain types of altered features 203 (like bug fixes versus major version changes) tend to lead to more test procedure failures. Likewise, the ML engine 210 may correlate specific types of test procedures with specific attributes. By using test outcomes (failures or passes) correlated to different types of attributes and different altered features 203, the ML engine 210 may train a classifier that generates probabilities of failing test procedures based on the altered features (and/or more specifically, based on an attribute of an altered feature).

TABLE 1

| Altered feature (software module) | Attribute 1 (Developer) | Attribute 2 nature of change | Attribute 3 major or minor | Attribute 4 (Day of Week) | Test Procedure | Classif. (0 will fail; 1 will pass) | Prob. |
|---|---|---|---|---|---|---|---|
| Payment module | John D. | Defect fix | Minor | Friday | Execute Credit card Tests | 0 | 0.4 |
| Payment module | John D. | Defect fix | Major | Friday | Execute add account tests | 0 | 0.3 |
| Payment module | John D. | Defect fix | Minor | Friday | Execute debit account tests | 1 | 0 |
| Other(s) | | | | | | | |

Table 1 illustrates an example of an altered feature 203 relating to a software module for payments. Changes to the payment module may be checked into the code repository 201 and may be associated with various attributes (Attribute 1-4). These changes may undergo various test procedures ("Execute credit card tests" "Execute add account tests" "Execute debit account tests" and so forth). The ML engine 210 may use some or all of the Attributes to classify whether the altered feature 230 will fail the corresponding test procedure. For instance, the ML engine 210 may determine that the "Execute credit card tests" and the "Execute add account tests" will fail but the "Execute debit account tests" will pass. It should be noted that the determined probability may be compared to a threshold value to determine the classification. For instance, a threshold value of 0.2 (20 percent probability of failure) may be classified as a failed test. The threshold may be set higher or lower as needed. These values may be used to rank the test procedures to generate a dynamic test order.

In examples, the ranking engine 204 may generate a dynamic testing pipeline based on the test procedures and the dynamic test order 310. The ranking engine 204 may provide the dynamic testing pipeline to the execution pipeline 208 for execution of the dynamic testing pipeline (shown in FIG. 2 as hashed lines). Alternatively, the ranking engine 204 may provide the dynamic testing pipeline and/or the test procedure and probabilities to the lifecycle assembly pipeline 206 for further processing into lifecycle stages before passing the dynamic testing pipeline to the execution pipeline 208 (also shown in FIG. 2 as hashed lines).

Processing at the lifecycle assembly pipeline 206 will be described first. The lifecycle assembly pipeline 206 may obtain a listing of lifecycle stages into which each test procedure is to be assigned. In other words, the lifecycle assembly pipeline 206 may group a subset of the test procedures into one of a plurality of lifecycle stages. A lifecycle stage may describe a discrete phase of a component from the time the component is created or updated to the time the component enters production (such as release to an end user).

In examples, a lifecycle stage may be associated with a set of test procedures that are to be conducted during the lifecycle stage. In some examples, lifecycle stages may be ordered in a testing pipeline such that one lifecycle stage is to follow another lifecycle stage. In some of these examples, execution of the testing pipeline may proceed to the next lifecycle stage only when test procedures associated with the current lifecycle stage in the pipeline have been passed.

Lifecycle stages may include, without limitation, a "preflight stage," a development or "dev" stage, a "testing" stage, a "staging" stage, and a "production" stage.

The preflight stage may include compilation and unit tests so that later lifecycle stages may complete faster and source code changes are made available for other developers or testers. In example lifecycles that include the preflight stage, initiation of the preflight stage may initiate processing of the testing pipeline. The development stage may include checks to ensure that code is deployable at run time, that authentication such as login/logout are operational and based sanity code checks are performed. The testing stage may include a variety of preprogrammed and/or manual tests that are performed to ensure that core functionality hasn't been broken by revisions or bug fixes, the application continues to operate as expected, and/or other tests to ensure that the application operates as expected. The staging stage may include testing the software in a staging environment that mimics the production environment to ensure that the software will function appropriately in the production environment. The production stage may include release to a production environment. This may include operation in an actual production environment and tests conducted in this environment.

Other stages and names for these stages may be used as well. Typically, though not necessarily, a lifecycle stage is handled by a respective group of participants that manages the stage.

Figure 4A:
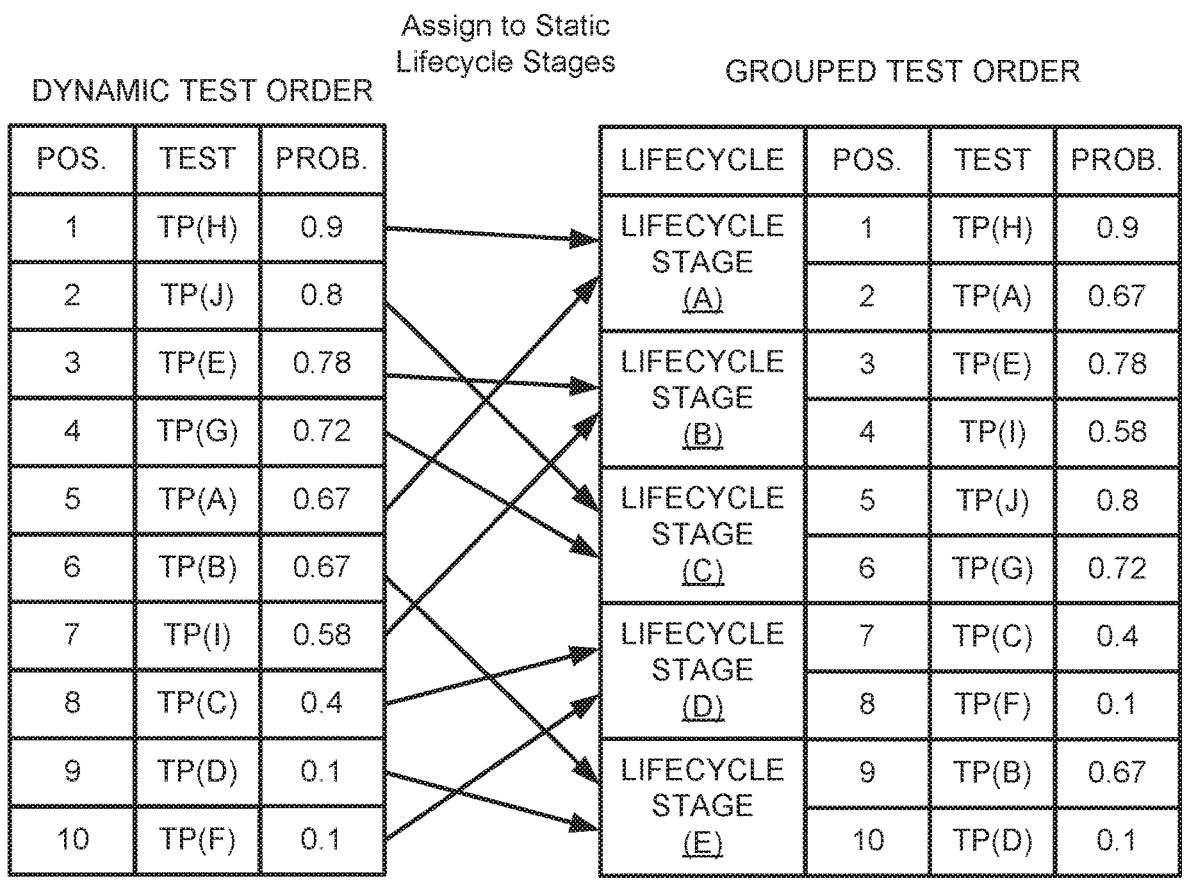
FIG. 4A shows a block diagram of an example dynamic testing pipeline grouped into lifecycle stages.

In some examples, an order of the lifecycle stages in the testing pipeline does not change. In these examples, the lifecycle assembly pipeline 206 may assign each test procedure to an appropriate lifecycle stage based on the probability of the test procedure being failed without changing the order of the lifecycle stages. In other words, test procedures within a lifecycle stage may be ordered according to their respective probabilities of being failed, but the lifecycle stages themselves may not be reordered. This example scenario is illustrated in FIG. 4A. Referring to FIG. 4A, which shows a block diagram of an example dynamic testing pipeline grouped into lifecycle stages, each test procedure (A)-(J) is assigned to one of a plurality of lifecycle stages (A)-(E). Test procedures in lifecycle stage A are to be tested before test procedures in lifecycle stage B; test procedures in lifecycle stage B are to be tested before test procedures in lifecycle stage C, and so forth. Within each lifecycle stage (A)-(E), the test procedures may be re-ordered based on their respective probabilities of being failed.

Figure 4B:
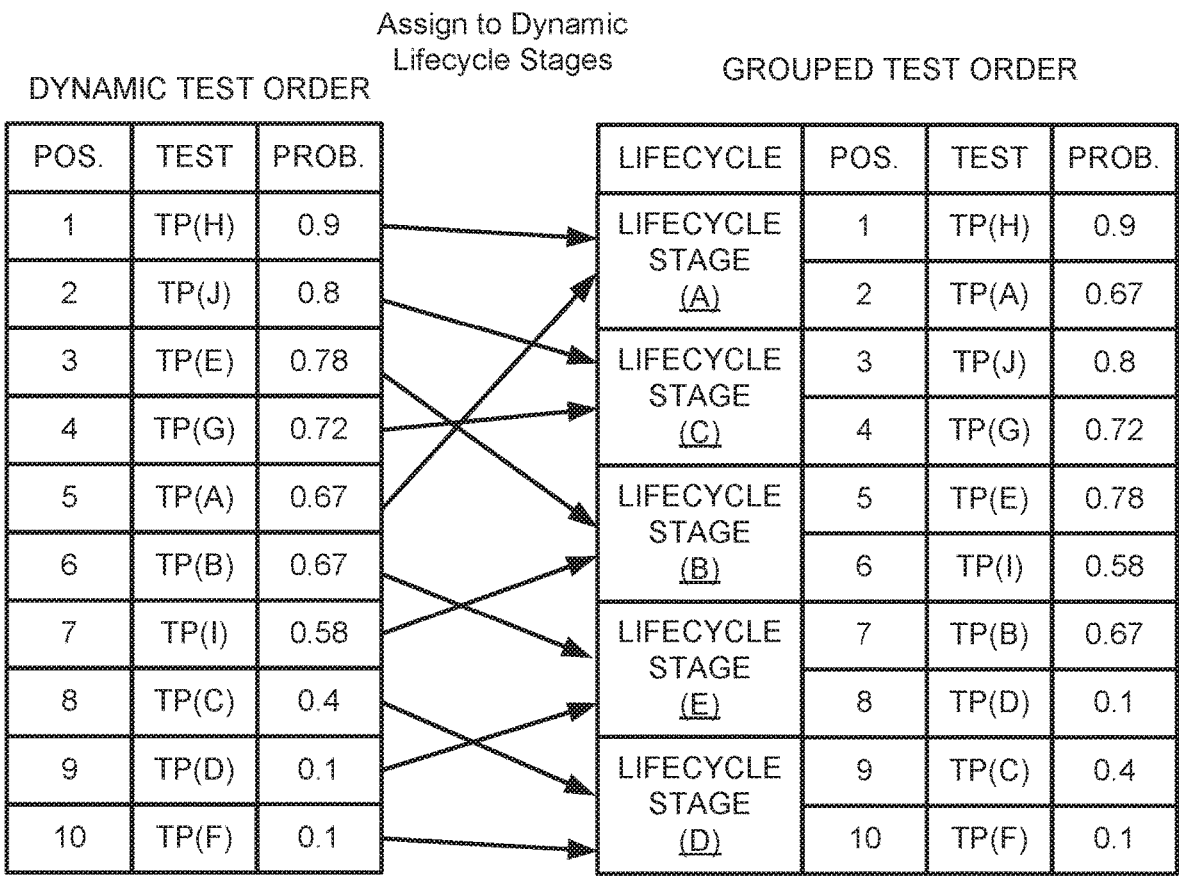
FIG. 4B shows a block diagram of another example dynamic testing pipeline grouped into lifecycle stages.

Alternatively, the order of the lifecycle stages may change in the testing pipeline. These lifecycle stages may be reordered based on respective test procedures assigned to a respective lifecycle stage. This example scenario is illustrated in FIG. 4B. For instance, the probabilities of test procedures being failed may dictate the order of the lifecycle stages (A)-(E). The lifecycle stage having the test procedure with the highest probability of being failed may be ordered as the first lifecycle stage to execute. In the illustrated example, test procedure TP(H) has the highest probability of being failed and it belongs to lifecycle stage A. Thus, lifecycle stage A is the first lifecycle stage to be executed. The test procedure with the next highest probability of being failed is test procedure TP(J). It belongs to lifecycle stage C. Thus, lifecycle stage C is the next lifecycle stage to be executed. This process may continue until all the test procedures have been grouped into lifecycle stages and all lifecycle stages have been accordingly ordered. In some alternative examples, the ordering of the lifecycle stages may be based on an average or other cumulative value of probabilities of each of the test procedures being failed. The order of test procedures within each lifecycle stage may be ordered based on their probabilities as previously described.

Although two test procedures are shown per lifecycle stage in each of FIGS. 4A and 4B, other numbers of test procedures may be assigned to a lifecycle stage as needed. Likewise, although five lifecycle stages are shown in each of FIGS. 4A and 4B, other numbers of lifecycle stages may be used as needed.

In either example (FIG. 4A or 48), the lifecycle assembly pipeline 206 may determine a time limit by which each lifecycle stage must be completed. The time limit for each lifecycle stage may be determined in various ways. For instance, the lifecycle assembly pipeline 206 may access historical information that indicates an amount time it took to complete each test procedure in a lifecycle stage in previously observed testing pipelines. The lifecycle assembly pipeline 206 may use the amounts of times to determine the time limit for that lifecycle stage. The amount of time it takes to complete a given test procedure may be the maximum observed time that test procedure has taken, an average amount of time, a median amount of time, a minimum amount of time, and/or other amounts of time. The time limit may be based on a sum and/or other cumulative value of the amounts of time. For instance, assuming that a lifecycle stage includes first and second test procedures: if a first test procedure in previously observed testing pipelines on average took one day to complete and a second test procedure in previously observed testing pipelines took two days to complete, then the time limit for the lifecycle stage may be determined to be three days. Other amounts of time previously mentioned may be used instead of the average as well.

In some examples, the assembly pipeline 206 may identify a threshold probability for each lifecycle stage such that any test procedure below the threshold is not considered for the time limit purposes. An average time that the test procedures above the threshold probability takes to complete may be used for the time limit determination. As such, only those test procedures that are deemed likely to fail (based on the threshold probability) may be accounted for in the time limit. For instance, continuing the previous example but adding third and fourth test procedures: if the third test procedure in previously observed testing pipelines on average took two day to complete and the fourth test procedure in previously observed testing pipelines took one day to complete, but only the first, second, and third test procedures are deemed likely to fail based on the threshold probability, then the amount of time for the fourth test procedure may be ignored for purposes of the time limit for the lifecycle stage. As such, the time limit for the lifecycle stage may be determined to be five days (one day for the first test procedure, two days for the second test procedure, and two days for the third test procedure). In these examples, the duration of a lifecycle stage is optimized by allotting testing time for only those test procedures that are deemed likely to fail. Put another way, the time limit for each lifecycle stage may be determined based on the prioritization of its respective test procedures.

The execution pipeline 208 may obtain the dynamic testing pipeline (whether directly from the ranking engine 204 or further processed by the lifecycle assembly pipeline 206) and cause the dynamic testing pipeline to be executed. For instance, the execution pipeline 208 may cause each test procedure to be executed according to the dynamic test order. Each test procedure may be caused to be executed by an appropriate tester 211. For instance, as the dynamic testing pipeline is executed, a tester 211 associated with performing the next test procedure may be provided with an alert that the altered feature 203 is ready for testing. It should be noted that the tester 211 may be a human tester or may be an automated testing procedure. In some examples, the execution pipeline 208 may release the altered feature 203 for testing. For instance, the altered feature 203 may be made unavailable to testers 211 until their respective test procedures are ready for testing based on the dynamic testing pipeline. In particular examples, the altered feature 203 may be unavailable for checking out from code repository 201 by a tester 211 until a test procedure to be conducted by the tester 211 is a current test procedure in the dynamic testing pipeline. Other ways to prevent testing until ready may be used, such as providing a testing platform (not shown) that is inaccessible to the tester 211 until a test procedure to be conducted by the tester 211 is a current test procedure in the dynamic testing pipeline.

In examples that use the lifecycle assembly pipeline 206, the execution pipeline 208 may implement the time limit for each lifecycle stage. To do so, the execution pipeline 208 may initiate a timer once a lifecycle stage has been initiated (and a corresponding test procedure is initiated by alerting a tester 211, releasing the altered feature 203 for testing, and/or otherwise causing a test procedure to be executed). When the execution pipeline 208 determines that the time limit has been reached based on the timer, the execution pipeline 208 may terminate a current lifecycle stage, such as by providing an alert to the appropriate tester 211 associated with the current lifecycle stage, locking the altered feature 203 from access, and/or otherwise causing the remaining test procedures in the current lifecycle stage to be terminated. Any pending test procedure may be deemed to be passed (or failed according to particular needs). The execution pipeline 208 may then initiate the next lifecycle stage in the dynamic testing pipeline.

A test outcome may be generated and stored in the test outcome repository 220. The test outcomes of the test outcome repository 220 may be used to re-train the machine-learned model of ML engine 210. For example, attributes associated with the altered feature 203 may be correlated with a failed or passed test procedure during the re-training process. As such, the probabilities of failure may be continuously re-trained based on observed test outcomes of test procedures.

If the test procedures in the dynamic testing pipeline are determined to have been passed, then the altered feature 203 may be validated and released from testing. For example, the altered feature 203 may be stored in the master repository 207 for production release of code that includes the altered feature.

Figure 5:
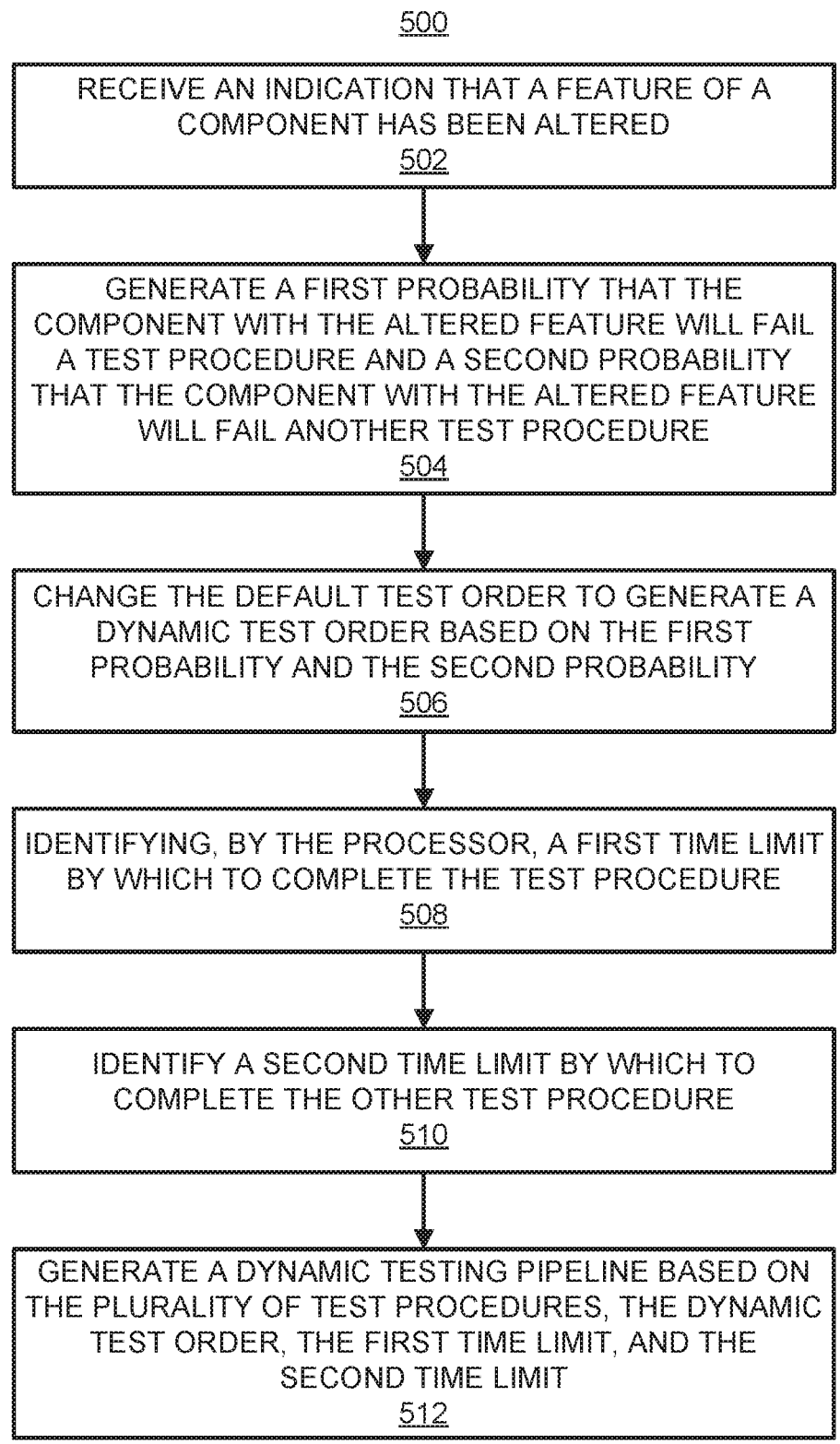
FIG. 5 shows a flow diagram of an example method for generating time-limited dynamic testing pipelines.

Various manners in which the apparatus 100 may operate to generate time-limited dynamic testing pipelines are discussed in greater detail with respect to the method 500 depicted in FIG. 5. It should be understood that the method 500 may include additional operations and that some of the operations described therein may be removed and/or modified without departing from the scopes of the method 500. The descriptions of the method 500 are made with reference to the features depicted in FIG. 1 for purposes of illustration.

FIG. 5 shows a flow diagram of an example method 500 for generating time-limited dynamic testing pipelines. As shown in FIG. 5, at block 502, the processor 102 may receive an indication that a feature of a component has been altered, wherein the altered feature is to be tested based on a plurality of test procedures to be executed in a default test order.

At block 504, the processor 102 may generate a first probability that the component with the altered feature will fail a test procedure and a second probability that the component with the altered feature will fail a second test procedure. At block 506, the processor 102 may change the default test order to generate a dynamic test order based on the first probability and the second probability. At block 508, the processor 102 may identify a first time limit by which to complete the first test procedure. At block 510, the processor 102 may identify a second time limit by which to complete the second test procedure. At block 512, the processor 102 may generate a dynamic testing pipeline based on the plurality of test procedures, the dynamic test order, the first time limit, and the second time limit.

Some or all of the operations set forth in the method 500 may be included as utilities, programs, or subprograms, in any desired computer accessible medium. In addition, the method 500 may be embodied by computer programs, which may exist in a variety of forms. For example, some operations of the method 500 may exist as machine-readable instructions, including source code, object code, executable code or other formats. Any of the above may be embodied on a non-transitory computer readable storage medium. Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

FIG. 6 shows a block diagram of an example non-transitory machine-readable storage medium for generates time-limited dynamic testing pipelines. The non-transitory machine-readable storage medium 600 may be an electronic, magnetic, optical, or other physical storage device that includes or stores executable instructions. The non-transitory machine-readable storage medium 600 may be, for example, Random Access memory (RAM), an Electrically Erasable Programmable Read-Only Memory (EEPROM), a storage device, an optical disc, and the like. The non-transitory machine-readable storage medium 600 may have stored thereon machine-readable instructions 602-612 that a processor, such as the processor 102, may execute.

The machine-readable instructions 602 may cause the processor to receive an indication that a feature of a component has been altered, wherein the altered feature is to be tested based on a plurality of test procedures to be executed in a default test order. The machine-readable instructions 604 may cause the processor to determine a respective probability that the component with the altered feature will fail each of the plurality of test procedures. The machine-readable instructions 606 may cause the processor to change the default test order to generate a dynamic test order based on the respective probabilities. The machine-readable instructions 608 may cause the processor to determine, for each of the plurality of test procedures, historical information indicating a duration of each test procedure. The machine-readable instructions 610 may cause the processor to identify a respective time limit by which to perform each of a plurality of lifecycle stages, each lifecycle stage including a corresponding subset of the plurality of test procedures and each respective time limit based on the historical information indicating the duration of each test procedure of the corresponding subset. The machine-readable instructions 612 may cause the processor to generate a dynamic testing pipeline based on the plurality of lifecycle stages, the dynamic test order, and the respective time limits.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure. For example, while examples of testing software code updates in a continuous integration and delivery environment are described, the disclosure may be applied to other components for which changes are to be tested and validated before release.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An apparatus, comprising:
    a processor; and
    a non-transitory computer readable medium on which is stored instructions that when executed by the processor, cause the processor to:
        receive an indication that a feature of a component has been altered, wherein the altered feature is to be tested based on a plurality of test procedures to be executed in a default test order;
        predict that the component with the altered feature will fail a test procedure among the plurality of test procedures;
        change the default test order to generate a dynamic test order that prioritizes the test procedure based on the prediction;
        assign a first subset of the plurality of test procedures to a first lifecycle stage, the first subset including the test procedure;
        order the first subset assigned to the first lifecycle stage according to an order in which the test procedures of the first subset appear in the dynamic test order;
        identify a first time limit in which to perform the first subset assigned to the first lifecycle stage; and
        generate a dynamic testing pipeline based on the plurality of test procedures, the dynamic test order, and the first time limit.

2. The apparatus of claim 1, wherein a second subset of the plurality of test procedures is assigned to a second lifecycle stage, and wherein the instructions further cause the processor to:
    determine that the first time limit has expired regardless of whether each test procedure of the first subset assigned to the first lifecycle stage has been completed; and
    proceed to the second lifecycle stage based on the determination that the first time limit has expired.

3. The apparatus of claim 2, wherein to proceed to the second lifecycle stage, the instructions further cause the processor to:
    release the component with the altered feature for testing in the second lifecycle stage, wherein the component with the altered feature was previously prevented from testing in the first lifecycle stage due to expiration of the first time limit.

4. The apparatus of claim 2, wherein to proceed to the second lifecycle stage, the instructions further cause the processor to:
    generate an alert that indicates that the second lifecycle stage is to be initiated.

5. The apparatus of claim 2, wherein the instructions further cause the processor to:
    identify a second time limit in which the second subset assigned to the second lifecycle stage is to be performed; and
    proceed to a third lifecycle stage when the second time limit has expired, regardless of whether each procedure within the second subset assigned to the second lifecycle stage has been completed.

6. The apparatus of claim 1, wherein to identify the first time limit, the instructions further cause the processor to:
    obtain historical information indicating a duration of each test procedure of the first subset; and
    determine the first time limit based on the historical information of each test procedure of the first subset.

7. The apparatus of claim 6, wherein to determine the first time limit based on the historical information of each test procedure of the first subset, the instructions further cause the processor to:
    determine a probability of failure for each test procedure of the first subset; and
    take into account within the first time limit the historical information of each test procedure of the first subset for which the probability of failure is greater than a threshold, such that the historical information of each test procedure of the first subset for which the probability of failure is not greater than the threshold is not taken into account within the first time limit.

8. The apparatus of claim 7, wherein to determine the first time limit based on the historical information of each test procedure of the first subset, the instructions further cause the processor to:
    determine an amount of time to complete each test procedure of the first subset; and
    determine the first time limit based on the amount of time to complete each test procedure of the first subset.

9. The apparatus of claim 1, wherein to predict that the component with the altered feature will fail the test procedure, the instructions further cause the processor to:
    obtain information that describes the altered component; and
    execute a machine-learned model of test outcomes based on the obtained information, wherein the machine-learned model generates the prediction.

10. The apparatus of claim 9, wherein the instructions further cause the processor to:
    obtain an outcome of the test procedure; and
    re-train the machine-learned model based on the outcome.

11. A method comprising:
    receiving, by a processor, an indication that a feature of a component has been altered, wherein the altered feature is to be tested based on a plurality of test procedures to be executed in a default test order;
    generating, by the processor, a first probability that the component with the altered feature will fail a test procedure and a second probability that the component with the altered feature will fail another test procedure;
    changing, by the processor, the default test order to generate a dynamic test order based on the first probability and the second probability;
    assigning, by the processor, a first subset of the plurality of test procedures to a first lifecycle stage, the first subset including the test procedure;
    assigning, by the processor, a second subset of the plurality of test procedures to a second lifecycle stage, the second subset including the other test procedure;
    ordering, by the processor, the first subset of the first lifecycle stage according to an order in which the test procedures of the first subset appear in the dynamic test order;
    ordering, by the processor, the second subset within the second lifecycle stage according to an order in which the test procedures of the second subset appear in the dynamic test order;

identifying, by the processor, a first time limit in which the first subset assigned to the first lifecycle stage is to be completed;

identifying, by the processor, a second time limit in which the second subset assigned to the second lifecycle stage is to be completed; and generating, by the processor, a dynamic testing pipeline based on the plurality of test procedures, the dynamic test order, the first time limit, and the second time limit.

12. The method of claim 11, further comprising:
training a machine-learned model of test outcomes based on previously executed dynamic testing pipelines, wherein the first probability and the second probability are each generated based on the machine-learned model.

13. The method of claim 11, wherein generating the dynamic pipeline further comprises:
ordering the first lifecycle stage and the second lifecycle stage within the dynamic testing pipeline in a different lifecycle stage order than a default lifecycle stage order, according to an order in which a test procedure in each of the first lifecycle stage and the second lifecycle stage having a highest probability of failure appear in the dynamic test order.

14. The method of claim 13, wherein the method further comprises:
permitting completion of as many of the first subset of the plurality of test procedures that are executable within the first time limit before proceeding to the second lifecycle stage, regardless of whether every test procedure of the first subset is completed within the first time limit; and permitting completion of as many of the second subset of the plurality of test procedures that are executable within the second time limit before proceeding to a third lifecycle stage, regardless of whether every test procedure of the second subset is completed within the second time limit.

15. A non-transitory computer readable medium on which is stored machine readable instructions that when executed by a processor, cause the processor to:
receive an indication that a feature of a component has been altered, wherein the altered feature is to be tested based on a plurality of test procedures to be executed in a default test order;

determine a respective probability that the component with the altered feature will fail each of the plurality of test procedures;

change the default test order to generate a dynamic test order based on the respective probabilities;

determine, for each of the plurality of test procedures, historical information indicating a duration of each test procedure;

identify a respective time limit in which to perform each of a plurality of lifecycle stages, each lifecycle stage including a corresponding subset of the plurality of test procedures and each respective time limit based on the historical information indicating the duration of each test procedure of the corresponding subset;

ordering the corresponding subset of the plurality of test procedures of each lifecycle stage according to an order in which the test procedures of the corresponding subset appear in the dynamic test order; and generate a dynamic testing pipeline based on the plurality of lifecycle stages, the dynamic test order, and the respective time limits.

16. The non-transitory computer readable medium of claim 15, wherein the plurality of test procedures are implemented as a development operations pipeline that provides automated testing of changes made to software.

17. The non-transitory computer readable medium of claim 16, wherein the plurality of lifecycle stages comprise one of: a preflight lifecycle stage, a development lifecycle stage, a testing lifecycle stage, a staging lifecycle stage, or a production stage.

18. The non-transitory computer readable medium of claim 15, wherein an order of the plurality of lifecycle stages is static.

19. The non-transitory computer readable medium of claim 15, wherein an order of the plurality of lifecycle stages is dynamic, and wherein the instructions when executed further cause the processor to:
order the plurality of lifecycle stages according to an order in which a test procedure in each lifecycle stage having a highest probability of failure appears in the dynamic test order.

20. The non-transitory computer readable medium of claim 15, wherein the instructions when executed further cause the processor to:
initiate execution of the dynamic testing pipeline;
access a test outcome of the dynamic testing pipeline; and
train a machine-learned model that provides a classification of whether a test procedure will fail based on a test result.

\* \* \* \* \*